United States Patent
Jeong et al.

(10) Patent No.: US 12,032,267 B2
(45) Date of Patent: Jul. 9, 2024

(54) LIGHT MODULATING DEVICE AND ELECTRONIC APPARATUS INCLUDING THE SAME

(71) Applicant: SAMSUNG ELECTRONICS CO., LTD., Suwon-si (KR)

(72) Inventors: Byunggil Jeong, Anyang-si (KR); Sunil Kim, Hwaseong-si (KR); Junghyun Park, Seoul (KR); Duhyun Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1010 days.

(21) Appl. No.: 16/790,993

(22) Filed: Feb. 14, 2020

(65) Prior Publication Data

US 2021/0055626 A1 Feb. 25, 2021

(30) Foreign Application Priority Data

Aug. 20, 2019 (KR) .................. 10-2019-0101869

(51) Int. Cl.
*G02F 1/31* (2006.01)
*G02B 5/08* (2006.01)
(Continued)

(52) U.S. Cl.
CPC .............. *G02F 1/31* (2013.01); *G02B 5/0816* (2013.01); *G02B 5/085* (2013.01); *G02B 5/12* (2013.01);
(Continued)

(58) Field of Classification Search
CPC ........ G02F 1/31; G02F 1/0151; G02F 1/0147; G02F 1/017; G02F 2201/30;
(Continued)

(56) References Cited

U.S. PATENT DOCUMENTS 8,585,206 B2 11/2013 Gollier
8,861,556 B2 10/2014 Larson
(Continued)

FOREIGN PATENT DOCUMENTS

CA 2 472 106 A1 8/2003
CN 102187262 A 9/2011
(Continued)

OTHER PUBLICATIONS

Yu Horie et al., "High-Speed, Phase-Dominant Spatial Light Modulation with Silicon-Based Active Resonant Antennas", ACS Photonics, vol. 5, 2018, pp. 1711-1717.
(Continued)

*Primary Examiner* — Christopher Stanford
*Assistant Examiner* — Journey F Sumlar
(74) *Attorney, Agent, or Firm* — Sughrue Mion, PLLC

(57) ABSTRACT

Provided a light modulating device including a variable mirror including a plurality of lattice structures, the plurality of lattice structures including a material having a refractive index that changes based on a temperature of the material, a distributed Bragg mirror spaced apart from the variable mirror and provided above the variable mirror, the distributed Bragg mirror including a first material layer and a second material layer that are alternately stacked, and a refractive index of the first material layer being different from a refractive index of the second material layer, and a heating portion configured to heat the plurality of lattice structures and provided below the variable mirror opposite to the distributed Bragg mirror.

24 Claims, 14 Drawing Sheets

(51) Int. Cl.
| | |
|---|---|
| *G02B 5/12* | (2006.01) |
| *G02B 6/28* | (2006.01) |
| *G02B 6/35* | (2006.01) |
| *G02B 6/42* | (2006.01) |
| *G02F 1/01* | (2006.01) |
| *G02F 1/015* | (2006.01) |
| *G02F 1/017* | (2006.01) |

(52) U.S. Cl.
CPC ......... *G02B 6/2856* (2013.01); *G02B 6/3576* (2013.01); *G02B 6/4269* (2013.01); *G02F 1/0147* (2013.01); *G02F 1/0151* (2021.01); *G02F 1/017* (2013.01); *G02F 2201/30* (2013.01); *G02F 2201/346* (2013.01); *G02F 2203/24* (2013.01)

(58) Field of Classification Search
CPC ..... G02F 2201/346; G02B 5/085; G02B 5/12; G02B 6/2856; G02B 6/3576; G02B 6/4269
See application file for complete search history.

(56) References Cited

U.S. PATENT DOCUMENTS

| | | | |
|---|---|---|---|
| 9,188,804 | B2 | 11/2015 | Powers et al. |
| 2001/0021294 | A1 | 9/2001 | Cai et al. |
| 2010/0045924 | A1 | 2/2010 | Powers et al. |
| 2015/0362167 | A1 | 12/2015 | Auyeung et al. |
| 2017/0033534 | A1* | 2/2017 | Chung ................ H01S 5/18397 |
| 2018/0046056 | A1 | 2/2018 | Na et al. |
| 2018/0196137 | A1 | 7/2018 | Lee et al. |
| 2018/0196138 | A1 | 7/2018 | Lee et al. |
| 2018/0224709 | A1* | 8/2018 | Inada ...................... G02F 1/295 |
| 2019/0033522 | A1 | 1/2019 | Baba et al. |
| 2019/0075275 | A1 | 3/2019 | Lee et al. |

FOREIGN PATENT DOCUMENTS

| | | |
|---|---|---|
| CN | 102709810 A | 10/2012 |
| CN | 102972029 A | 3/2013 |
| CN | 103532009 A | 1/2014 |
| CN | 106207748 A | 12/2016 |
| CN | 107728341 A | 2/2018 |
| CN | 109426010 A | 3/2019 |
| EP | 3521919 A1 | 8/2019 |
| JP | 2004-133285 A | 4/2004 |
| JP | 2006-251331 A | 9/2006 |
| KR | 10-2018-0082305 A | 7/2018 |
| KR | 10-1924890 B1 | 12/2018 |
| WO | 2008/125797 A1 | 10/2008 |
| WO | 2015155188 A2 | 10/2015 |

OTHER PUBLICATIONS

Communication dated Oct. 19, 2020 issued by the European Patent Office in European Application No. 20172003.4.

Gu, X., et al., "Electro-Thermal Beam Steering Using Bragg Reflector Waveguide Amplifier", Japanese Journal of Applied Physics, vol. 51, Feb. 1, 2012, XP055537237, pp. 020206-1 to 020206-3 (4 pages).

Nakamura, K., "Slow-light Bragg reflector waveguide array for two-dimensional beam steering", Japanese Journal of Applied Physics, vol. 53, No. 3, Jan. 31, 2014, XPO55537235, pp. 038001-1 to 038001-3 (4 pages).

Communication dated Oct. 30, 2023, issued by the China National Intellectual Property Administration in Chinese Application No. 202010086775.0.

Hou, "Research on a Novel Silica Fiber Distributed Bragg Reflective Single-Frequency Laser for Advanced Applications," Doctoral Dissertation, Apr. 20, 2019, Total 146 pages.

Hasler et al., "Simulation of the generation of high-power pulses in the GHz range with three-section DBR lasers," IEE Proceedings—Optoelectron, vol. 149, No. 4, Aug. 2002, Total 9 pages.

* cited by examiner

LIGHT MODULATING DEVICE AND ELECTRONIC APPARATUS INCLUDING THE SAME

CROSS-REFERENCE TO RELATED APPLICATION

This application claims priority to Korean Patent Applications No. 10-2019-0101869, filed on Aug. 20, 2019, in the Korean Intellectual Property Office, the disclosure of which is incorporated herein in its entirety by reference.

BACKGROUND

1. Field

Example embodiments of the present disclosure relate to light modulating devices and electronic apparatuses including the same.

2. Description of Related Art

Recently, light detection and ranging (LiDAR) systems have been used as sensors or scanners for detecting obstacles, in the fields of autonomous driving devices such as smart cars, robots, etc.

LiDAR systems may generally include a beam steering apparatus for radiating laser to a target point. A beam steering apparatus may include a plurality of channels that respectively modulate a phase of incident light to desired shapes. Due to interference of light passing through each of the channels, a phase distribution formed by the plurality of channels may be set such that the incident light may be steered at a constant angle and emitted.

For the phase modulation as above, each of the channels may include a material having an optical characteristic that varies depending on an applied signal, and a channel structure capable of rapidly and accurately adjusting a steering angle is necessary.

SUMMARY

One or more example embodiments provide light modulating devices capable of modulating incident light in various forms.

One or more example embodiments also provide beam steering devices using an array of light modulating devices.

Additional aspects will be set forth in part in the description which follows and, in part, will be apparent from the description, or may be learned by practice of the example embodiments of the disclosure.

According to an aspect of an example embodiment, there is provided a light modulating device including a variable mirror including a plurality of lattice structures, the plurality of lattice structures including a material having a refractive index that changes based on a temperature of the material, a distributed Bragg mirror spaced apart from the variable mirror and provided above the variable mirror, the distributed Bragg mirror including a first material layer and a second material layer that are alternately stacked, and a refractive index of the first material layer being different from a refractive index of the second material layer, and a heating portion configured to heat the plurality of lattice structures and provided below the variable mirror opposite to the distributed Bragg mirror.

The light modulating device may further include a spacer layer provided between the variable mirror and the distributed Bragg mirror, the spacer layer being configured to provide a resonant distance.

The spacer layer may include a material having a refractive index that is less than the refractive index of the plurality of lattice structures.

The plurality of lattice structures may be provided at a period in a direction perpendicular to a direction in which the first material layer and the second material layer are stacked.

The heating portion may include a heater that is electrically heated and configured to heat the plurality of lattice structures.

The heating portion may include an electric resistor configured to heat the plurality of lattice structures, and a circuit element layer configured to supply an electric current to the electric resistor.

The electric resistor may include a plurality of sub-resistors configured to heat a divided region of the variable mirror.

The light modulating device may further include a meta optical device provided above the distributed Bragg mirror opposite to the variable mirror, the meta optical device including a plurality of nanostructures.

A shape distribution of the plurality of nanostructures may be set to increase a phase modulation range between the variable mirror and the distributed Bragg mirror based on a change in the refractive index of the plurality of lattice structures.

The light modulating device may further include a substrate including a through hole and a metal plug provided in the through hole, the substrate configured to support the heating portion.

The light modulating device may further include a heat sink provided on a surface of the substrate opposite to the heating portion.

According to an aspect of another example embodiment, there is provided a beam steering device including a substrate, a phase modulating device including a plurality of phase modulation channels that are repeatedly provided on the substrate, wherein each of the plurality of phase modulation channels includes a variable mirror including a plurality of lattice structures, each of the plurality of lattice structures including a material having a refractive index that changes based on a temperature of the material, and a distributed Bragg mirror spaced apart from the variable mirror and provided above the variable mirror, the distributed Bragg mirror including a first material layer and a second material layer that are alternately stacked, and a refractive index of the first material layer being different from a refractive index of the second material layer, a heating portion provided between the substrate and the phase modulating device, the heating portion being configured to apply heat to each of the plurality of lattice structures, and a controller configured to apply a control signal to the heating portion.

The beam steering device may further include trenches that are provided between adjacent phase modulation channels among the plurality of phase modulation channels.

The trenches may include air trenches, vacuum trenches, or heat insulation trenches configured to prevent a thermal transfer between adjacent phase modulation channels.

The trenches may partly extend in the heating portion.

The trenches may extend to a certain depth of the substrate.

The heating portion may include a plurality of electric resistors respectively facing the plurality of phase modulation channels in a one-to-one correspondence, and a circuit element layer configured to supply an electric current to the plurality of electric resistors.

Each of the plurality of electric resistors may include a plurality of sub-resistors that are configured to heat a divided region of a phase modulation channel facing each electric resistor among the plurality of phase modulation channels.

The trenches may extend to a region between adjacent electric resistors among the plurality of electric resistors.

The substrate may include a through hole and a metal plug provided in the through hole.

The beam steering device may further include a heat sink provided on a surface of the substrate opposite to the heating portion.

Each of the plurality of phase modulation channels may further include a spacer layer provided between the variable mirror and the distributed Bragg mirror, and configured to provide a resonant distance, the spacer layer including a material having a refractive index less than a refractive index of the plurality of lattice structures.

The plurality of lattice structures may be provided at a period in a direction perpendicular to a direction in which the first material layer and the second material layer are stacked.

Each of the plurality of phase modulation channels may further include a meta optical device provided above the distributed Bragg mirror, the meta optical device including a plurality of nanostructures.

A shape distribution of the plurality of nanostructures may be set to increase a phase modulation range between the variable mirror and the distributed Bragg mirror based on a change in the refractive index of each of the plurality of lattice structures.

According to yet another aspect of an example embodiment, there is provided an electronic apparatus including a light source configured to emit light, a beam steering device configured to steer the light emitted from the light source towards an object, the beam steering device including a substrate, a phase modulating device including a plurality of phase modulation channels that are repeatedly provided on the substrate, wherein each of the plurality of phase modulation channels includes a variable mirror including a plurality of lattice structures, each of the plurality of lattice structures including a material having a refractive index that changes based on a temperature of the material, and a distributed Bragg mirror spaced apart from the variable mirror and provided above the variable mirror, the distributed Bragg mirror including a first material layer and a second material layer that are alternately stacked, and a refractive index of the first material layer being different from a refractive index of the second material layer, a heating portion provided between the substrate and the phase modulating device, the heating portion being configured to apply heat to each of the plurality of lattice structures, and a controller configured to apply a control signal to the heating portion, and a processor configured to analyze a location or a shape of the object based on a signal transmitted from the sensor.

According to yet another aspect of an example embodiment, there is provided a beam steering device including a substrate, a phase modulating device including a plurality of phase modulation channels that are repeatedly provided on the substrate, wherein each of the plurality of phase modulation channels include a variable mirror including a plurality of lattice structures, each of the plurality of lattice structures including a material having a refractive index that changes based on a temperature of the material, and a distributed Bragg mirror spaced apart from the variable mirror and provided above the variable mirror, the distributed Bragg mirror including a first material layer and a second material layer that are alternately stacked, and a refractive index of the first material layer being different from a refractive index of the second material layer, a heating portion provided between the substrate and the phase modulating device, the heating portion being configured to apply heat to each of the plurality of lattice structures, trenches that are provided between adjacent phase modulation channels among the plurality of phase modulation channels, a metal plug provided in a through hole that is provided in the substrate, and a controller configured to apply a control signal to the heating portion.

The beam steering device may further include a heat sink provided on a surface of the substrate opposite to the heating portion.

BRIEF DESCRIPTION OF THE DRAWINGS

The above and/or other aspects, features, and advantages of the disclosure will be more apparent from the following description of example embodiments taken in conjunction with the accompanying drawings, in which.

DETAILED DESCRIPTION

Figure 1:
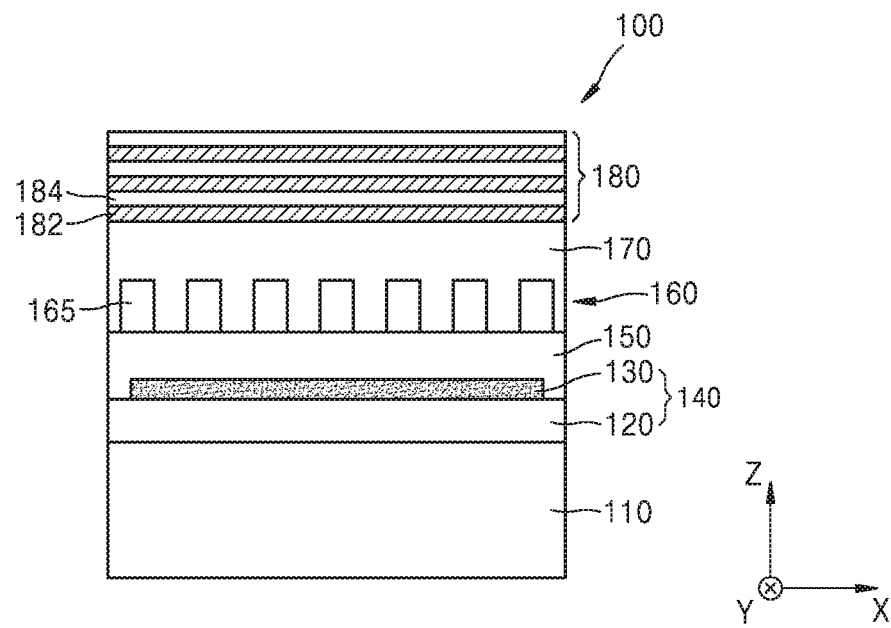
FIG. 1 is a cross-sectional view of a light modulating device according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

When a layer, a film, a region, or a panel is referred to as being "on" another element, it may be directly on the other layer or substrate, or intervening layers may also be present.

It will be understood that although the terms "first," "second," etc. may be used herein to describe various components, these components should not be limited by these terms. These components are only used to distinguish one component from another. The terms do not define that the components have different materials or structures from each other.

An expression used in the singular encompasses the expression of the plural, unless it has a clearly different meaning in the context. Throughout the specification, when a portion "includes" an element, another element may be further included, rather than excluding the existence of the other element, unless otherwise described.

In addition, the terms such as " . . . unit", "module", etc. provided herein indicates a unit performing at least one function or operation, and may be realized by hardware, software, or a combination of hardware and software.

As used herein, in particular, terms such as "the" and demonstratives similar thereto used herein may be to indicate both the singular and the plural.

Also, the steps of all methods described herein may be performed in any suitable order unless otherwise indicated herein or otherwise clearly contradicted by context. The use of any and all examples, or example language (e.g., "such as") provided herein, is intended merely to better illuminate the present disclosure and does not pose a limitation on the scope of the present disclosure unless otherwise claimed.

FIG. 1 is a cross-sectional view of a light modulating device 100 according to an example embodiment.

The light modulating device 100 may include a variable mirror 160, a distributed Bragg mirror 180 provided on the variable mirror 160, and a heating portion 140 applying heat to the variable mirror 160 from below the variable mirror 160. The variable mirror 160 includes lattice structures 165 including a material having a refractive index that varies due to heat.

The variable mirror 160 and the distributed Bragg mirror 180 form a resonant structure, and a phase of incident light is modulated due to a change in a resonant characteristic according to the change in the refractive index of the lattice structures 165 included in the variable mirror 160.

A detailed structure of the light modulating device 100 will be described in detail below.

The distributed Bragg mirror 180 includes a first material layer 182 and a second material layer 184, wherein the first material layer 182 and the second material layer 184 have different refractive indices from each other. The first material layer 182 and the second material layer 184 may be alternately and repeatedly stacked with a thickness of about ¼ of a wavelength of light that is to be modulated. The distributed Bragg mirror 180 may set a reflectivity thereof to a desired value by adjusting a difference between the refractive indices of the first material layer 182 and the second material layer 184 and the number of repeated stacks. The reflectivity thereof may be set based on a light emitting direction in relation to a reflectivity of the variable mirror 160. For example, the number of times the first material layer 182 and the second material layer 184 are stacked may be set such that the reflectivity of the distributed Bragg mirror 180 is less than that of the variable mirror 160. In this case, the incident light may be modulated and emitted towards the distributed Bragg mirror 180.

The first material layer 182 may include silicon, and the second material layer 184 may include silicon oxide. However, materials of the distributed Bragg mirror 180 are not limited thereto. For example, the first material layer 182 and the second material layer 184 may include various materials having different refractive indices. For example, the first material layer 182 and the second material layer 184 may include a semiconductor compound of the same group and may be set to exhibit different refractive indices from each other by changing their composition ratios.

The variable mirror 160 includes a plurality of lattice structures 165 having a refractive index greater than that of a peripheral material. The refractive index along one direction may repeatedly change due to the lattice structures 165. The plurality of lattice structures 165 may be arranged at predetermined cycles in a direction that is perpendicular to a direction in which the first material layer 182 and the second material layer 184 in the distributed Bragg mirror 180 are stacked.

The lattice structures 165 may have, for example, strip shapes extending in a Y-direction and may be arranged at predetermined cycles in an X-direction. However, the lattice structure 165 is not limited to the above example, and may have any kind of shape provided that the lattice structures 165 are arranged with a certain regularity in a direction perpendicular to the direction in which the first material layer 182 and the second material layer 184 are stacked.

The lattice structure 165 may include a material having a refractive index that varies based on receiving heat. The lattice structure 165 may include, for example, a silicon material. The material in the lattice structure 165 is not limited to the above example, and the lattice structure 165 may include a material, in which a phase transition occurs and a permittivity changes at a temperature equal to or greater than a predetermined temperature when the heat is applied thereto. For example, the lattice structure 165 may include vanadium (IV) oxide ($VO_2$), $VO_2O_3$, europium (iii) oxide (EuO), manganese (II) oxide (MnO), cobalt (II) oxide (CoO), cobalt (II) peroxide ($CoO_2$), cobalt lithium oxide ($LiCoO_2$), or $Ca_2RuO_4$).

A spacer layer 170 may be further provided between the lattice structures 165 and the distributed Bragg mirror 180. The spacer layer 170 fills spaces among the plurality of lattice structures 165 and extends over the lattice structures 165, and may have a thickness by which a predetermined resonant distance may be provided between the variable mirror 160 and the distributed Bragg mirror 180. The resonant distance may be set taking into account a wavelength band of the light to be modulated.

The spacer layer 170 may include a material having a refractive index that is less than that of the lattice structure 165. For example, when the lattice structure 165 includes a silicon material, the spacer layer 170 may include a silicon oxide material, but is not limited thereto.

The heating portion 140 may heat the lattice structures 165 to change the refractive index of the lattice structures

165. The heating portion 140 may include a heater that is electrically heated. The heater may be an electrical resistive material that generates heat by Joule-Heating. The heating portion 140 may include an electrical resistor 130 and a circuit element layer 120 that includes a circuit element configured to supply electric current to the electrical resistor 130.

The electrical resistor 130 may include tungsten. In addition, the electrical resistor 130 may include iron, chromium, nickel, etc., or a relatively high resistivity alloy such as a nichrom alloy, an iron-nickel-chromium-based, a nickel-manganese-based, a nickel-copper-based, a manganese-copper-based alloy, etc.

A protective layer 150 may be provided between the heating portion 140 and the variable mirror 160. The protective layer 150 may protect the electrical resistor 130 and may support the lattice structures 165. The protective layer 150 may include, for example, a silicon oxide material, but is not limited thereto.

The heating portion 140, the variable mirror 160, the spacer layer 170, and the distributed Bragg mirror 180 may be sequentially stacked on a substrate 110. The substrate 110 may include a silicon substrate, but is not limited thereto.

Figure 2:
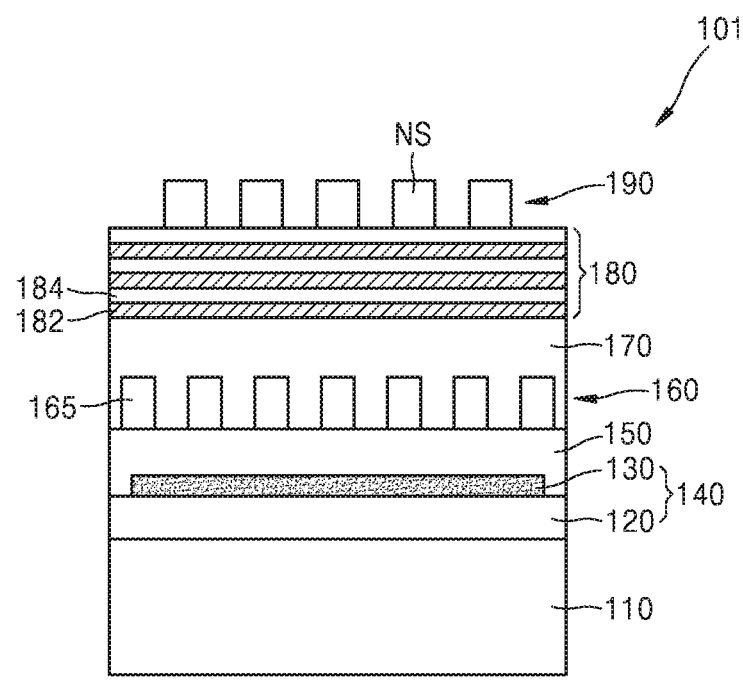
FIG. 2 is a cross-sectional view of a light modulating device according to another example embodiment.

FIG. 2 is a cross-sectional view of a light modulating device 101 according to another example embodiment.

The light modulating device 101 according to the example embodiment further includes a meta optical device 190 in addition to the light modulating device 100 of FIG. 1.

The light modulating device 101 may include the heating portion 140, the variable mirror 160, the spacer layer 170, the distributed Bragg mirror 180, and the meta optical device 190 provided on the distributed Bragg mirror 180 opposite to the spacer layer 170. The meta optical device 190 may include a plurality of nanostructures NS.

The meta optical device 190 may be provided in order to increase a phase modulation range of the light modulating device 101. A phase modulation amount between the variable mirror 160 and the distributed Bragg mirror 180 is determined according to a refractive index of the lattice structures 165 included in the variable mirror 160. The meta optical device 190 may perform an additional phase modulation on the phase-modulated light as above. The phase modulation range between the variable mirror 160 and the distributed Bragg mirror 180 may be set according to the change in the refractive index of the lattice structures 165 included in the variable mirror 160, and when the meta optical device 190 is included in the light modulating device, the phase modulation range may be increased. The phase modulation may be more sensitive with respect to the change in the refractive index of the lattice structures 165, due to the meta optical device 190.

The plurality of nanostructures NS may have sub-wavelength shape dimensions which includes numerical values related to shapes of the nanostructures NS. For example, shape dimension includes thickness and lengths perpendicular to the thickness direction and defining a shape of a cross-section. Also, the sub-wavelength shape dimension indicates dimension less than a wavelength of the light that is to be modulated. In FIG. 2, the nanostructures NS all have the same shapes and sizes, but embodiments are not limited thereto.

Figure 3A:
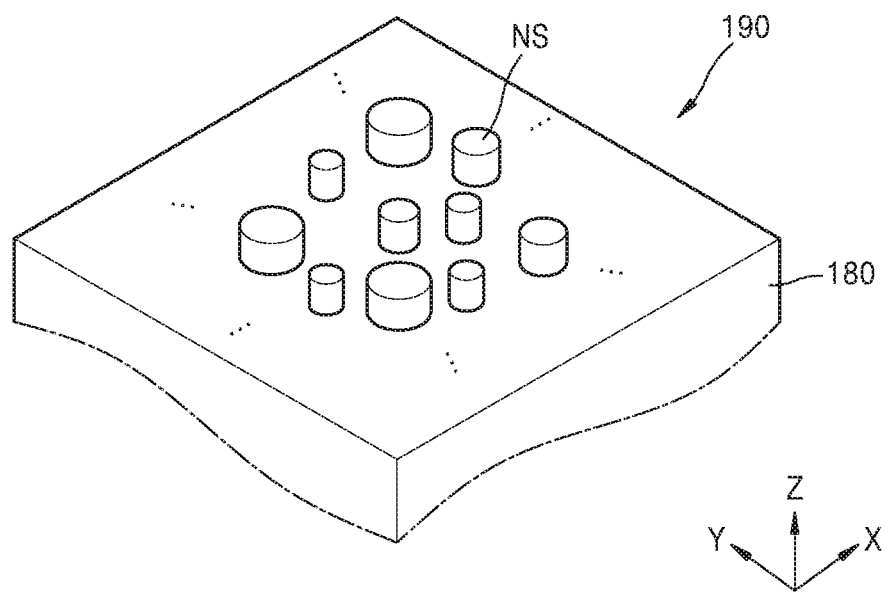
FIGS. 3A and 3B are perspective views showing examples of a meta optical device included in the light modulating device of FIG. 2.
Figure 3B:
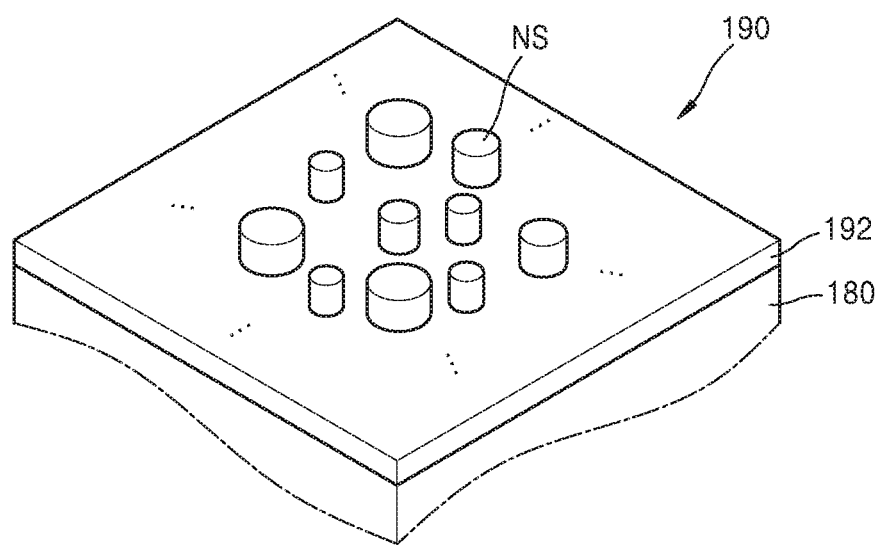

FIGS. 3A and 3B are perspective views showing examples of a meta optical device included in the light modulating device of FIG. 2.

The nanostructures NS may have various dimensions. A shape distribution of the plurality of nanostructures NS may be random or conform with a certain rule. Here, shape distribution may include a shape and a size of each nanostructure NS, an arrangement interval of the plurality of nanostructures NS, a shape distribution according to locations, a size distribution according to locations, and an arrangement interval distribution according to locations. The shape distribution of the plurality of nanostructures NS is determined based on a phase modulation range targeted by the light modulating device 101. For example, the shape distribution of the plurality of nanostructures NS may be set to additionally increase the phase modulation range between the variable mirror 160 and the distributed Bragg mirror 180 according to the change in the refractive index of the lattice structures 165 included in the variable mirror 160.

The nanostructures NS may include a material having a refractive index that is greater than that of a peripheral material. For example, the material of the nanostructure NS may have a refractive index that is greater than those of the first material layer 182 and the second material layer 184 included in the distributed Bragg mirror 180. The first material layer 182 may include a material having a relatively high refractive index and the second material layer 184 may include a material having a relatively low refractive index, where the second material layer 184 of the relatively low refractive index is provided at an uppermost layer of the distributed Bragg mirror 180. In this example, the nanostructures NS may include a material having a refractive index that is greater than that of the second material layer 184, and equal to that the refractive index of the first material layer 182. For example, the nanostructures NS and the first material layer 182 may include a silicon material, and the second material layer 184 may include a silicon oxide material.

The materials included in the nanostructures NS are not limited to the above examples, and various materials may be selected. The nanostructures NS may include a dielectric material. The nanostructures NS may include one of single crystalline silicon, polycrystalline silicon (poly Si), amorphous silicon, silicon nitride ($Si_3N_4$), gallium phosphide (GaP), titanium oxide ($TiO_2$), aluminum antimonide (AlSb), aluminum arsenide (AlAs), aluminum gallium arsenide (AlGaAs), aluminum gallium phosphide (AlGaInP), boron phosphide (BP), and zinc-germanium diphosphide ($ZnGeP_2$).

The nanostructures NS may include a conductive material. The conductive material may include a highly conductive metal material on which a surface plasmon excitation may occur. For example, at least one selected from copper (Cu), aluminum (Al), nickel (Ni), iron (Fe), cobalt (Co), zinc (Zn), titanium (Ti), ruthenium (Ru), rhodium (Rh), palladium (Pd), platinum (Pt), argentum (Ag), osmium (Os), iridium (Ir), and aurum (Au) may be adopted, and the conductive material may include an alloy including at least one selected from the above. Also, the conductive material may include a two-dimensional (2D) material having an excellent conductivity such as graphene or conductive oxide.

According to an example embodiment, some of the nanostructures NS may include a dielectric material having a relatively high refractive index and the other nanostructures NS may include a conductive material.

The nanostructures NS may have a transmission intensity and a transmission phase according to respective materials and shapes of each of the nanostructures NS. The shape distribution may be adjusted to adjust a phase or intensity distribution of light passing through the meta optical device 190.

For example, a desired transmission intensity distribution or transmission phase distribution may be obtained by adjusting sizes in a horizontal or vertical direction or component materials according to locations. In order to obtain the desired transmission intensity distribution or transmission phase distribution, a shape distribution of the nanostructures NS at each location may be determined with respect to a group including the nanostructures NS. Also, a group of the nanostructures NS formed as above may be repeatedly arranged at a predetermined cycle. The shape distribution of the plurality of nanostructures NS may be regular, periodic, or quasi-periodic, but is not limited thereto. For example, the shape distribution of the plurality of nanostructures NS may be random.

FIG. 3A shows that the nanostructures NS are directly provided on an upper surface of the distributed Bragg mirror 180, but embodiments are not limited thereto. For example, an additional support layer configured to support the nanostructures NS may be separately formed.

Referring to FIG. 3B, the meta optical device 190 may further include a support layer 192 that is provided on an upper surface of the distributed Bragg mirror 180 to support the plurality of nanostructures NS.

The support layer 192 may include a material having a refractive index less than that of the nanostructures NS. The support layer 192 may include a silicon oxide material, or the support layer 192 may include transparent conductive oxide (TCO) or a polymer such as polycarbonate (PC), polystyrene (PS), and poly methyl methacrylate (PMMA). The material in the support layer 192 is not limited to the above examples, and various materials having a different refractive index from that of the nanostructures NS may be used in the support layer 192. A difference between the refractive index of the support layer 192 and the refractive index of the nanostructures NS may be about 0.5 or greater.

In FIGS. 3A and 3B, the nanostructure NS has a cylindrical shape, but is not limited thereto. In each of the nanostructures NS, a shape of a cross-section that is perpendicular to the thickness direction thereof, that is, a cross-section in parallel with an XY plane, may have various shapes such as a polygonal shape, a cross shape, an asymmetric shape, etc. Also, the nanostructures NS have the same shapes as one another, but embodiments are not limited thereto. For example, nanostructures NS having various shapes may be used in the meta optical device 190.

FIGS. 4A to 4D are perspective views showing examples of a nanostructure NS included in the meta optical device 190 of FIG. 3.

Figure 4A:
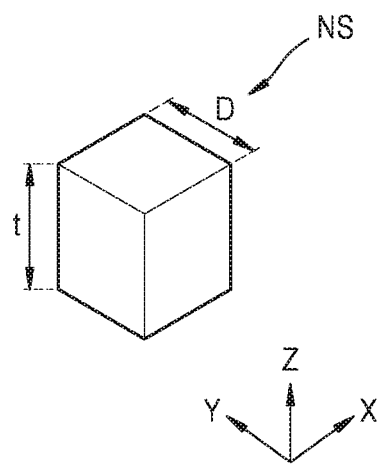
FIGS. 4A to 4D are perspective views showing examples of a nanostructure included in the meta optical device of FIG. 3.

Referring to FIG. 4A, the nanostructure NS may have a square pillar shape having a thickness t. A cross-sectional square may have a square shape having a length D on each of the four sides, but embodiments are not limited thereto. For example, the cross-sectional square may have a rectangular shape. The nanostructure NS may be in another polygonal pillar shape.

Figure 4B:
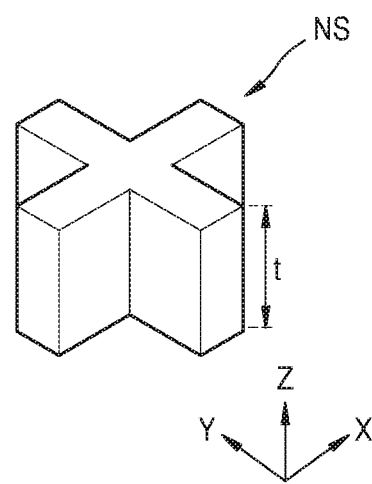

Referring to FIG. 4B, the nanostructure NS may have a cross-section of a cross shape. The cross-sectional shape may be symmetric, but may be changed to be asymmetric.

An asymmetric shape of the nanostructure NS may be adopted to form different transmission phase distributions depending upon a polarization of the incident light.

Figure 4C:
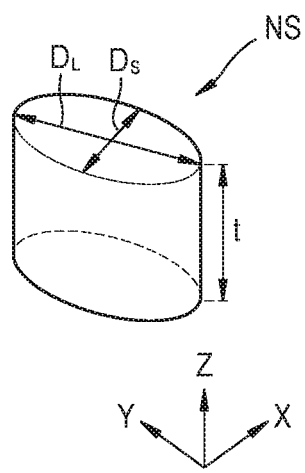

Referring to FIG. 4C, the nanostructure NS may have an asymmetric shape, for example, an elliptical pillar shape. Since the nanostructure NS has an elliptical shape having a major axis length $D_L$ and a minor axis length $D_S$ that are different from each other, different transmission phase distributions may be exhibited with respect to the polarization in parallel with the major axis direction and polarization in parallel with the minor axis direction. That is, different optical actions may show with respect to the polarization in parallel with the major axis direction and the polarization in parallel with the minor axis direction.

Figure 4D:
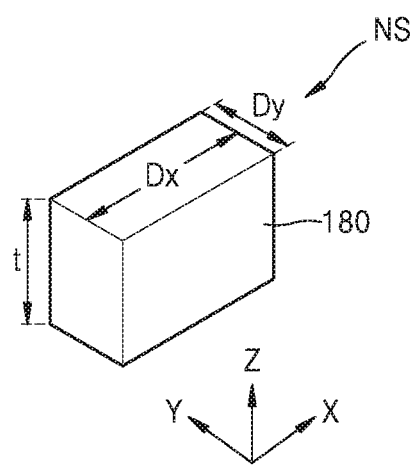

Referring to FIG. 4D, the nanostructure NS may have an asymmetric shape, for example, a rectangular parallelepiped shape having a rectangular cross-section of a longitudinal length $D_x$ and a transverse length $D_y$. Similarly to the example of FIG. 4C, the rectangular parallelepiped shape may be also applied to form different transmission phase distributions depending upon the polarization of the incident light. For example, different optical actions may be exhibited according to polarization of the incident light.

The examples of the nanostructures NS shown in FIGS. 4A to 4D, combinations, and modified examples thereof may be applied to the meta optical device 190. The meta optical device 190 may modulate the incident light into a desired shape by adjusting shapes, sizes, and arrangement rules of the nanostructures NS. The shape distribution may be determined such that the light modulation range between the variable mirror 160 and the distributed Bragg mirror 180 may be increased and an additional optical action may be shown.

Figure 5:
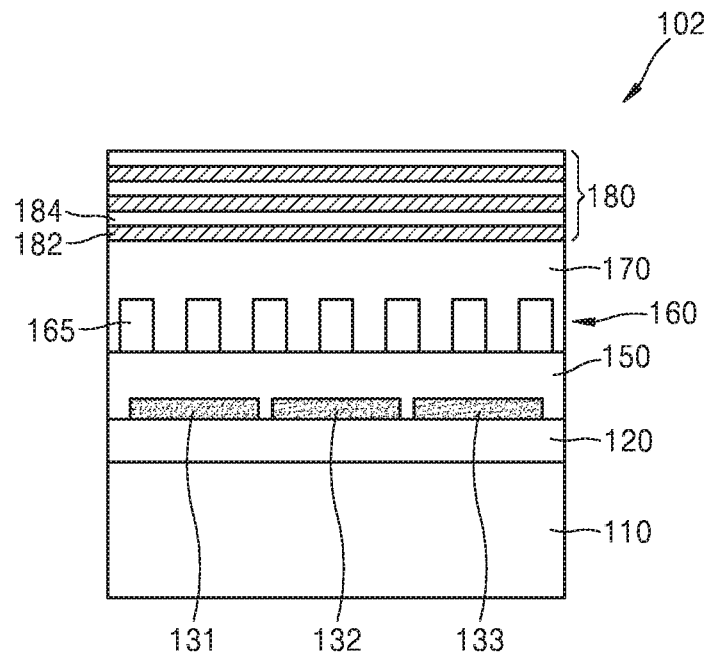
FIG. 5 is a cross-sectional view of a light modulating device according to another example embodiment.

FIG. 5 is a cross-sectional view of a light modulating device 102 according to another example embodiment.

The light modulating device 102 of the example embodiment includes a plurality of sub-resistors 131, 132, and 133 configured to heat different parts of the variable mirror 160 to the light modulating device 100 of FIG. 1.

The sub-resistors 131, 132, and 133 are provided to divide the variable mirror 160 into divided regions and heat the divided regions to obtain a refractive index gradient of the lattice structures 165.

Three sub-resistors 131, 132, and 133 are shown to divide the variable mirror 160 into three regions, but embodiments are not limited thereto, and the number of sub-resistors may be modified. Also, the sub-resistors 131, 132, and 133 may have the same shapes and sizes, but shapes and sizes thereof may be modified.

The plurality of sub-resistors 131, 132, and 133 may differently heat each region of the variable mirror 160 that they are respectively facing. The plurality of sub-resistors 131, 132, and 133 may each have a material, a shape, and a circuit element. Different electric currents may be applied to the plurality of sub-resistors 131, 132, and 133, but embodiments are not limited thereto. For example, even when the same electric current is applied to the plurality of sub-resistors 131, 132, and 133, amounts of heat generated by the plurality of sub-resistors 131, 132, and 133 may be different from one another when the shapes or materials of the sub-resistors are different from one another. Since the plurality of sub-resistors 131, 132, and 133 are provided, the divided regions of the variable mirror 160 may be heated at different temperatures and a desired temperature distribution may be obtained. The plurality of sub-resistors 131, 132, and 133 may be configured to improve a temperature uniformity in the variable mirror 160 range by finely adjusting a heating amount, in addition to the forming of the temperature distribution for obtaining the refractive index gradient.

Figure 6:
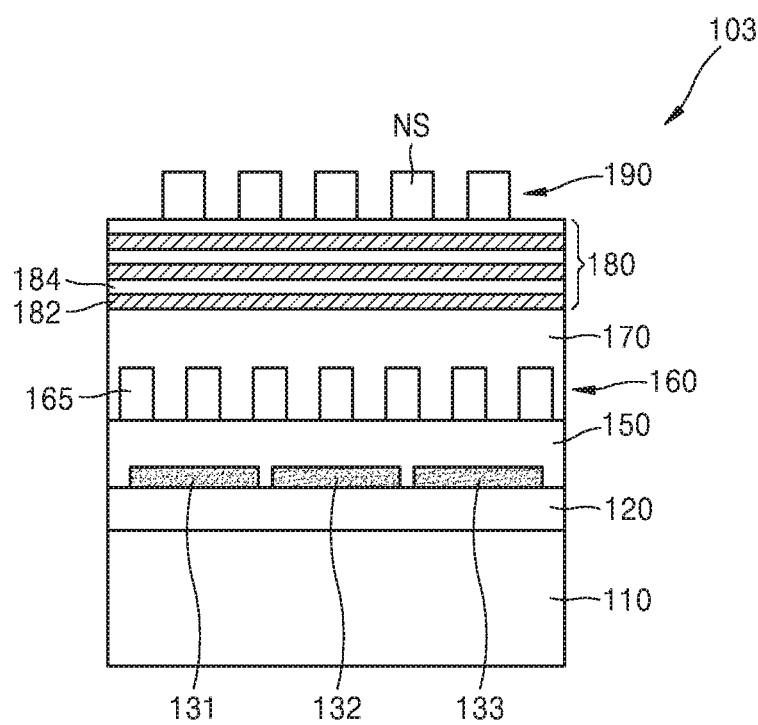
FIG. 6 is a cross-sectional view of a light modulating device according to another example embodiment.

FIG. 6 is a cross-sectional view of a light modulating device 103 according to another example embodiment.

The light modulating device 103 according to the example embodiment may further include the meta optical device 190 on an upper portion of the distributed Bragg mirror 180 to the light modulating device 100 of FIG. 5.

The meta optical device 190 may include the nanostructures NS having a shape distribution that is set based on the additional light modulation performance, as described above with reference to FIGS. 3A and 3B. Also, the refractive index gradient in the variable mirror 160 may be considered, where the refractive index gradient of the variable mirror 160 is obtained according to the plurality of sub-resistors 131, 132, and 133.

Figure 7:
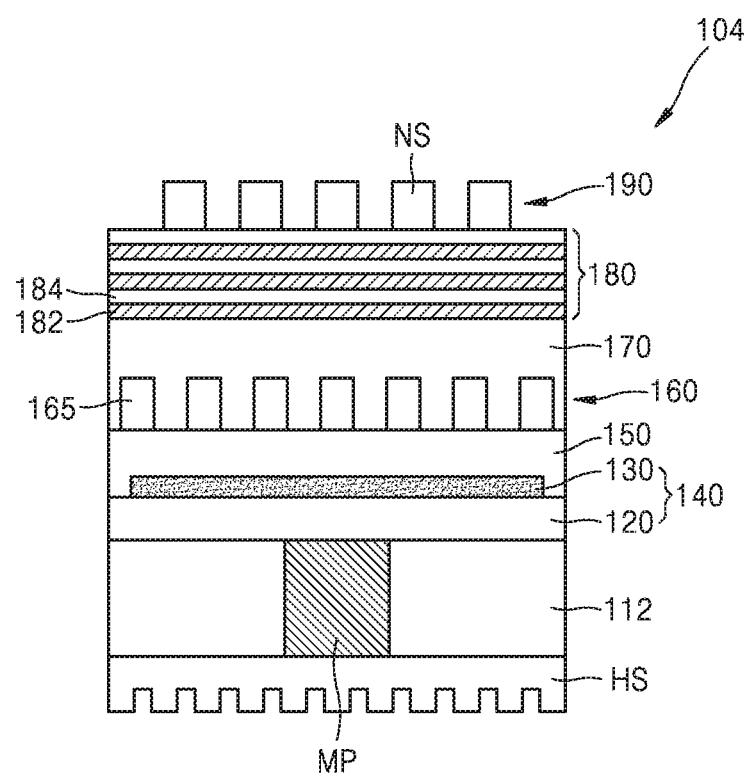
FIG. 7 is a cross-sectional view of a light modulating device according to another example embodiment.

FIG. 7 is a cross-sectional view of a light modulating device 104 according to another example embodiment.

The light modulating device 104 according to the example embodiment is different from the light modulating devices 100, 102, 102, and 103 described above, in view of further including a structure for effectively discharging the heat generated by the heating portion 140.

A substrate 112 includes a through hole and a metal plug MP is provided in the through hole. The heat generated by the heating portion 140 may be effectively dissipated to outside via the metal plug MP that includes a material having a relatively high thermal conductivity.

A heat sink HS may be further provided on a lower surface of the substrate 112. The heat sink HS includes a material having a high thermal conductivity and may include a plurality of heat dissipation fins that increase a surface area thereof.

The light modulating device 104 may represent the phase modulation that varies depending on the applied heat. In order for a series of phase modulations to sequentially occur, heat suitable for respective sequences is provided to the variable mirror 160. Based on the above heat dissipation structure, the heat applied in a previous sequence may be effectively dissipated and not affect the heat to be applied in a next sequence, and thus, the accuracy of the desired light modulation may be improved.

FIG. 7 shows that the light modulating device 104 includes both the metal plug MP and the heat sink HS, but embodiments are not limited thereto. For example, only one of the metal plug MP and the heat sink HS may be used. Also, the number of metal plugs MP or a width of the metal plug MP penetrating through the substrate 112 may be set based on the material of the substrate 112 and the heat dissipation effect.

In FIG. 7, the metal plug MP and the heat sink HS are added to the light modulating device FIG. 2, but the metal plug MP and the heat sink HS may be also applied to the light modulating devices 100, 102, and 103 shown in FIGS. 1, 5, and 6.

Figure 8:
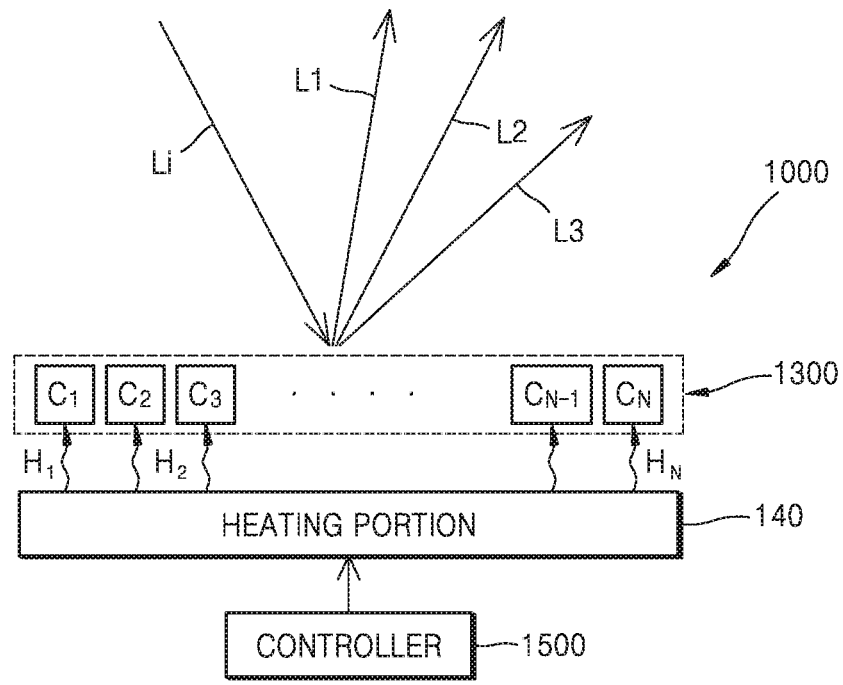
FIG. 8 is a conceptual diagram of a beam steering device according to an example embodiment.

FIG. 8 is a conceptual diagram of a beam steering device 1000 according to an example embodiment.

The beam steering device 1000 includes a phase modulating device 1300, the heating portion 140 applying heat to the phase modulator 1300, and a controller 1500 controlling the heating portion 140, wherein the phase modulating device 1300 includes a plurality of phase modulation channels $C_1, \ldots, C_N$.

The plurality of phase modulation channels $C_1, \ldots, C_N$ included in the phase modulating device 1300 may each modulate a phase of incident light Li independently from one another. The incident light Li is emitted as modulated light of a predetermined shape that is determined according to a combination of phases represented respectively by the plurality of phase modulation channels $C_1, \ldots, C_N$.

The controller 1500 sets a phase combination that is suitable for a shape of modulated light to be formed, and accordingly, controls the heating portion 140 after setting a control signal to be applied to each of the phase modulation channels $C_1, \ldots, C_N$. The heating portion 140 is heated according to the control signal of the controller 1500. For example, each of a plurality of heaters included in the heating portion 140 may be separately heated. Heat $H_1, \ldots, H_N$ are applied respectively to the plurality of phase modulation channels $C_1, \ldots, C_N$.

Each of the plurality of phase modulation channels $C_1, \ldots, C_N$ may include a variable mirror and a distributed Bragg mirror as in the light modulating devices described above. The variable mirror may include a plurality of lattice structures including a material having a refractive index varying depending on the heat and the distributed Bragg mirror includes two material layers alternately stacked on the variable mirror and having different refractive indices. The variable mirror included in each of the phase modulation channels $C_1, \ldots, C_N$ may have an optical property that changes according to applied heat, and the phase modulation channels $C_1, \ldots, C_N$ may represent different phase modulation properties from one another.

When the phase modulating device 1300 is controlled by the controller 1500 to exhibit a predetermined phase modulation combination, the incident light Li is emitted as the modulated light L1. The modulated light L1 may be obtained by steering the incident light Li to a predetermined direction. The modulation may be implemented when, for example, a combined shape of the phases of the plurality of phase modulation channels $C_1, \ldots, C_N$ has a linear shape.

The controller 1500 may control the heating portion 140 to implement another phase combination. Accordingly, the incident light Li may be emitted as another modulated light L2. In order to change a steering angle, for example, the steering angle may be adjusted by making the phases of the plurality of phase modulation channels $C_1, \ldots, C_N$ form the linear shape and setting an inclination of the straight line.

The controller 1500 may control the heating portion 140 to implement another phase combination, and accordingly, the incident light Li may be emitted as modulated light L3.

As described above, the incident light Li may be modulated as the modulated light L1, L2, or L3 propagating toward a desired direction. When the phase modulations are sequentially performed, the incident light Li may scan a predetermined object. In this case, the accuracy of the beam steering may be improved when the heat applied in a previous sequence is effectively dissipated before a next sequence starts and a thermal transfer between neighboring channels is blocked.

Figure 9:
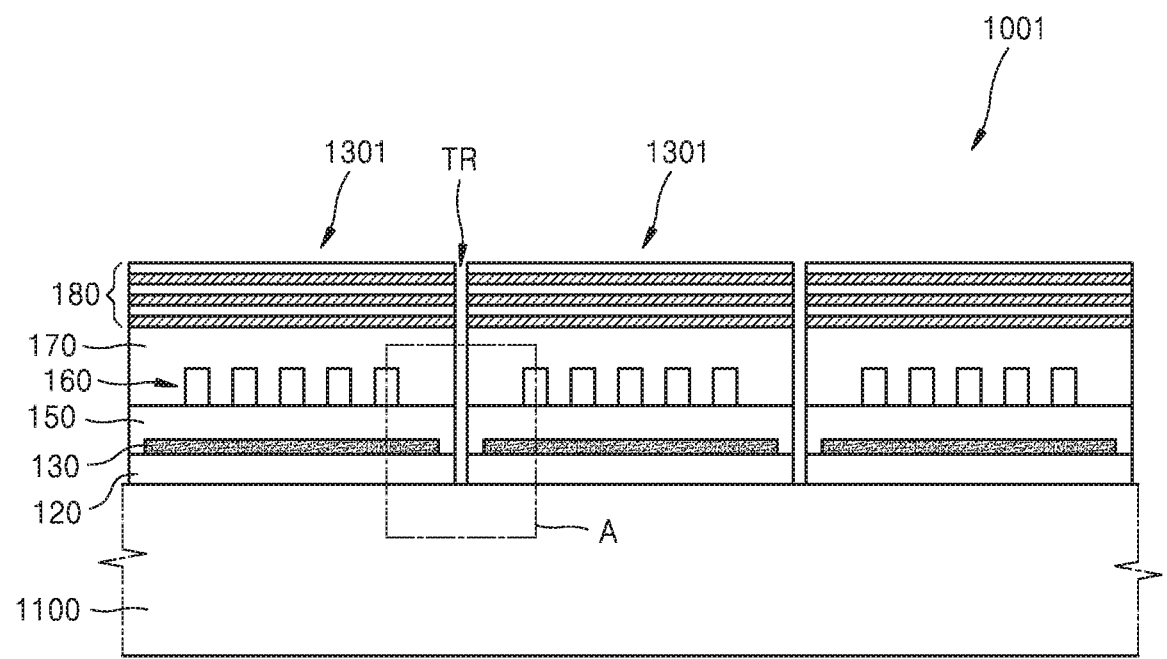
FIG. 9 is a cross-sectional view of a beam steering device according to an example embodiment.

FIG. 9 is a cross-sectional view of a beam steering device 1001 according to an example embodiment. FIGS. 10A to 10D are partially enlarged views of trenches in a beam steering device according to a modified example of the beam steering device 1001 of FIG. 9.

The beam steering device 1001 includes a substrate 1100, a plurality of phase modulation channels 1301 repeatedly arranged on the substrate 1100, and the heating portion 140 controlled by a controller to apply heat to each of the plurality of phase modulation channels 1301.

Each of the phase modulation channels 1301 may include, as described above, the variable mirror 160 including the plurality of lattice structures 165 including a material having a refractive index that varies depending on the heat, and the distributed Bragg mirror 180 including two material layers having different refractive indices, wherein the two material layers are spaced apart from the variable mirror 160 and alternately stacked.

Three phase modulation channels 1301 are shown in FIG. 9, but the number of phase modulation channels is not limited thereto, and the phase modulation channels may be one-dimensionally or two-dimensionally arranged.

Among the plurality of phase modulation channels 1301, trenches TR may be formed for physically spacing the plurality of phase modulation channels 1301 from one another.

The trenches TR are formed to distinguish the plurality of phase modulation channels 1301 from one another, to heat each phase modulation channel 1301 to a desired temperature, and to maintain the heat temperature. In addition, even when the temperature is set differently in a next sequence, heating and maintaining at the set temperature may be more easily performed. Heat insulation between neighboring channels may be firmly performed by the trench TR and thus the channels may be less affected by peripheral temperature. In addition, after finishing the heating operation in one sequence, the heat is rapidly dissipated, and thus the operation in a next sequence may be more sufficiently performed.

The trenches TR may include an air trench, a vacuum trench, or a heat insulating trench configured to prevent the thermal transfer between neighboring phase modulation channels. That is, a space in the trench TR may include air, may be in a vacuum state, or may be filled by another heat insulating material.

A width of the trench TR may be tens to hundreds of nm. The width of the trench TR may be set within a range in which a desired heat insulation effect may be exhibited.

A depth of the trench TR is set such that at least adjacent variable mirrors 160 are separated from each other with the trench TR therebetween, and may extend to the region of the heating portion 140 in order to further improve the thermal block effect. The depth of the trench TR is shown to extend to an upper surface of the substrate 1100, but is not limited to thereto, and may be set differently.

Figure 10A:
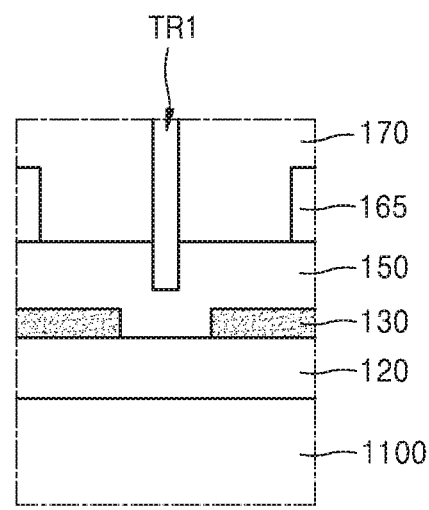
FIGS. 10A to 10D are partially enlarged views of trenches in a beam steering device according to modified examples of the beam steering device of FIG. 9.

For example, as shown in FIG. 10A, a trench TR1 may extend to a partial depth of the protective layer 150 that covers an upper portion of the electric resistor 130.

Figure 10B:
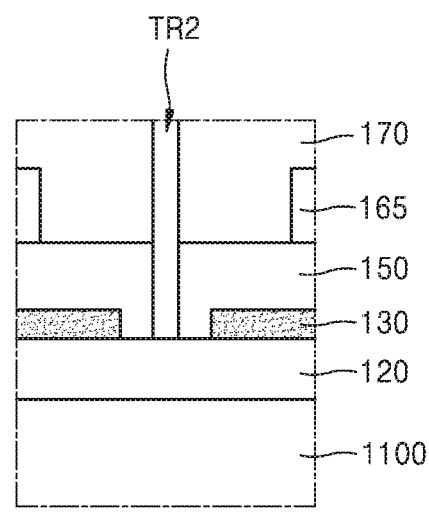

As shown in FIG. 10B, a trench TR2 may penetrate entirely through the protective layer 150 and extend to an upper surface of the circuit element layer 120.

Figure 10C:
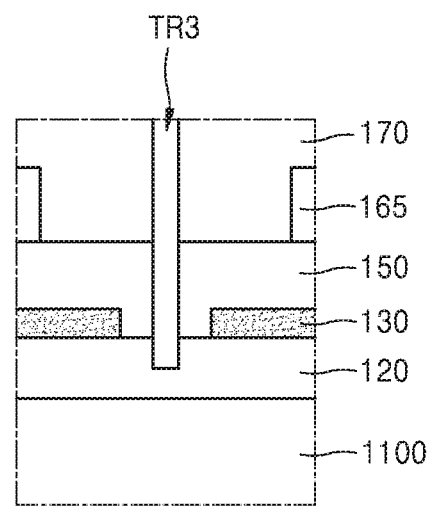

As shown in FIG. 10C, a trench TR3 may entirely penetrate through the protective layer 150 and extend to a certain depth in the circuit element layer 120.

Figure 10D:
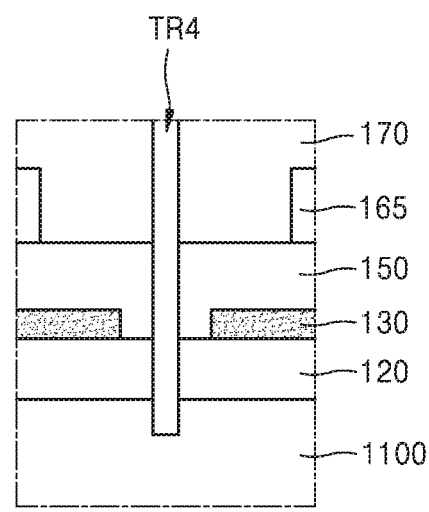

As shown in FIG. 10D, a trench TR4 may entirely penetrate through the circuit element layer 120 and extend to a certain depth in the substrate 1100.

Depths of the trenches TR, TR1, TR2, TR3, and TR4 may be set based on the heat insulation effect between neighboring channels, a detailed structure of the heating portion 140, etc.

Figure 11:
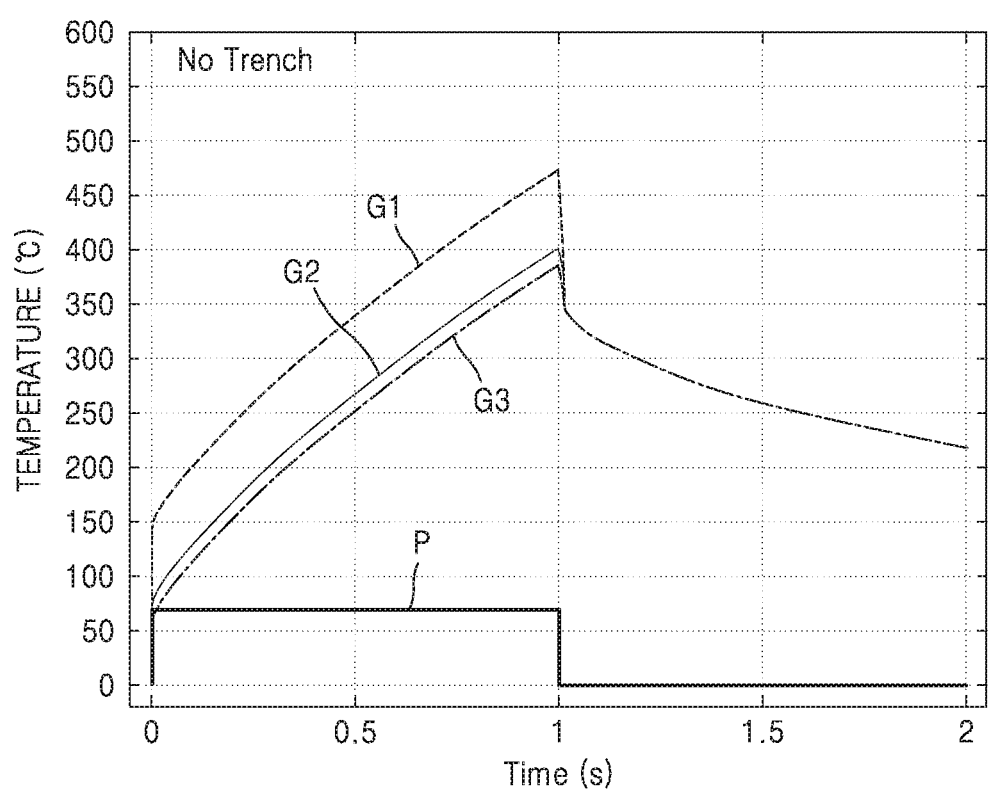
FIGS. 11 and 12 are computer simulation graphs of heat blocking performances between adjacent channels in beam steering devices according to a related example and an example embodiment.
Figure 12:
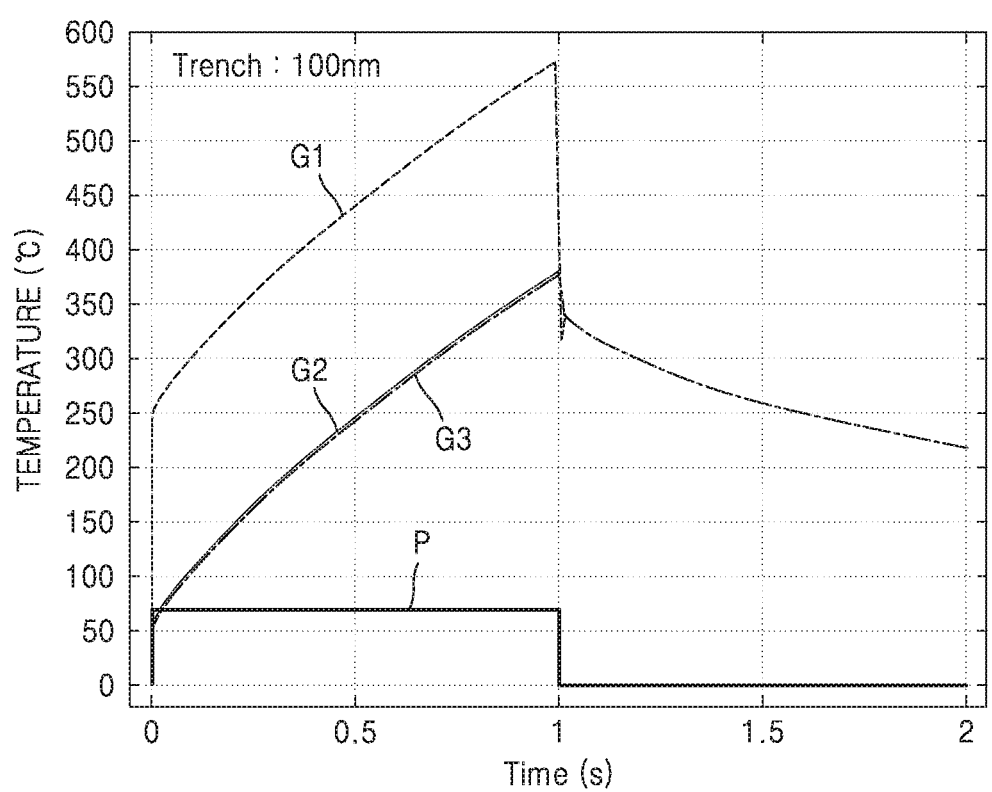

FIGS. 11 and 12 are computer simulation graphs of heat blocking performances between adjacent channels in beam steering devices according to a related example and an example embodiment.

The beam steering device of the example embodiment is the beam steering device shown in FIG. 9 with trenches of 100 nm width, and a beam steering device according to the related example is a modified example of the beam steering device of FIG. 9, wherein the beam steering device of the related example has no trench and thus neighboring channels are connected.

In the graphs of FIGS. 11 and 12, a pulse signal P applied from the heating portion 140 to one channel is denoted as P and a temperature variation of a driving channel to which the pulse signal P is applied is denoted as G1. Also, G2 denotes a temperature variation of an adjacent channel, and G3 denotes a temperature variation in a channel that is farthest from the driving channel.

Referring to FIG. 11, when there is no trench according to the related embodiment, a temperature of an adjacent channel increases, as well as a temperature of the driving channel to which a heating signal is applied. Also, the temperature of the driving channel may not increase to a desired level due to the thermal transfer to neighboring channels.

However, referring to FIG. 12, in the beam steering device including the trenches according to the example embodiment, a difference between a temperature of the driving channel to which the heating signal is applied and a temperature of the adjacent channel is clearly shown. The temperature of the adjacent channel is similar to a temperature of the channel that is farthest from the driving channel. Since the thermal transfer to the adjacent channel is blocked, the temperature of the driving channel is higher than that of the related example.

Figure 13:
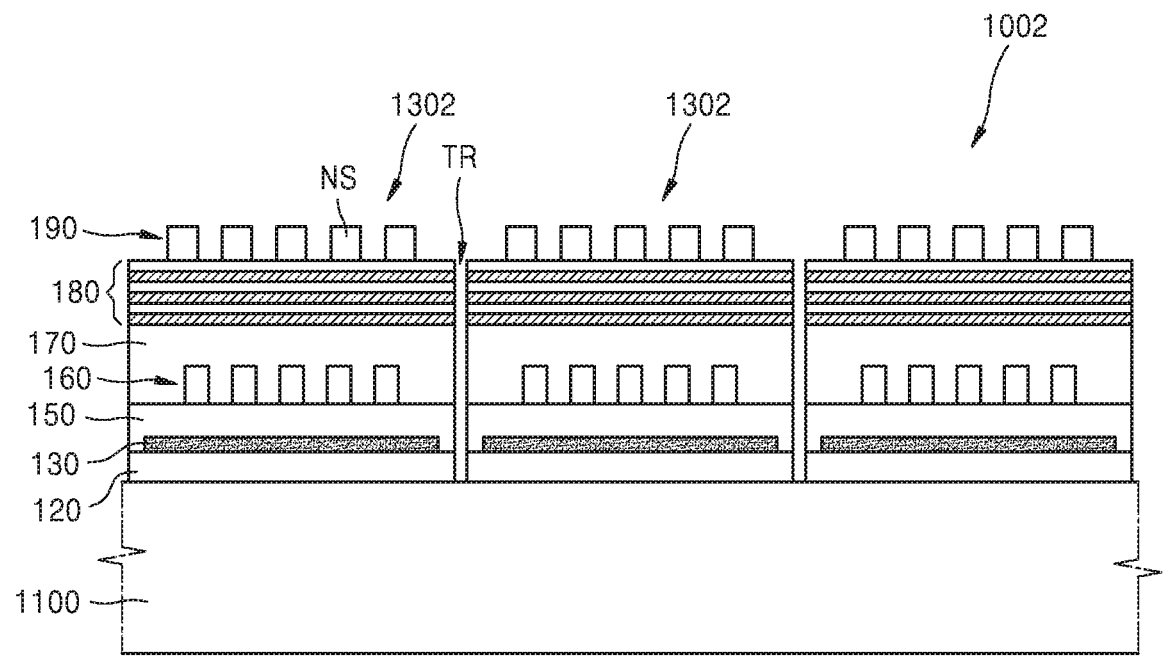
FIG. 13 is a cross-sectional view of a beam steering device according to another example embodiment.

FIG. 13 is a cross-sectional view of a beam steering device 1002 according to another example embodiment.

The beam steering device 1002 according to the example embodiment is different from the beam steering device 1001 of FIG. 9 in that the phase modulation channel 1302 further includes the meta optical device 190.

As described above with reference to FIGS. 2 to 4, the meta optical device 190 may include the plurality of nanostructures NS, a shape distribution of which is set for performing an additional optical action of each phase modulation channel 1302. The meta optical devices 190 in the plurality of phase modulation channels 1302 are not necessarily the same as one another, but may be differently set according to locations of the phase modulation channels 1302 relative to one another.

Figure 14:
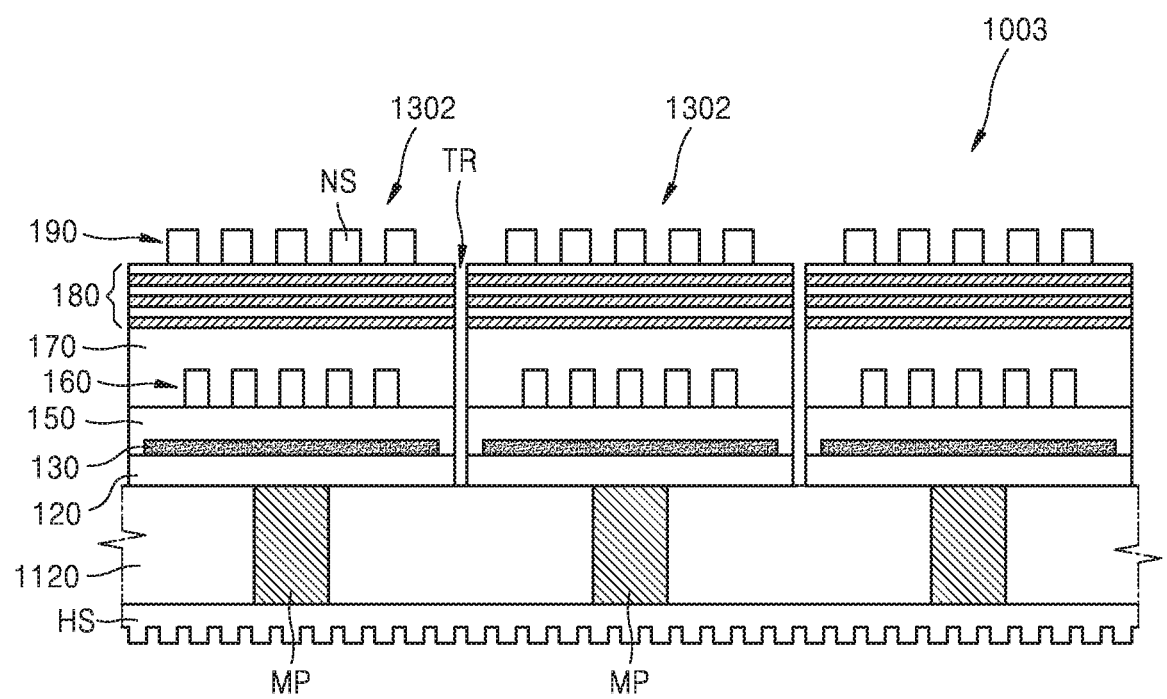
FIG. 14 is a cross-sectional view of a beam steering device according to another example embodiment.

FIG. 14 is a cross-sectional view of a beam steering device 1003 according to another example embodiment.

The beam steering device 1003 of the example embodiment is different from the beam steering device 1002 of FIG. 13 in that a substrate 1120 includes the metal plug MP and the heat sink HS is further provided on a lower surface of the substrate 1120.

The substrate 1120 may include a plurality of metal plugs MP that penetrate through the substrate 1120. In FIG. 14, the metal plugs MP are shown to face the plurality of phase modulation channels 1302 in a one-to-one correspondence, but the number or locations of the metal plugs MP are not limited to the above example. The substrate 1120 may be formed by, for example, forming a plurality of through holes in a silicon substrate and filling the through holes with a metal material by an electroplating method.

The beam steering device 1003 of the example embodiment includes the metal plugs MP and the heat sink HS, but embodiments are not limited thereto. For example, the beam steering device 1003 may include only one of the metal plugs MP and the heat sink HS.

Figure 15:
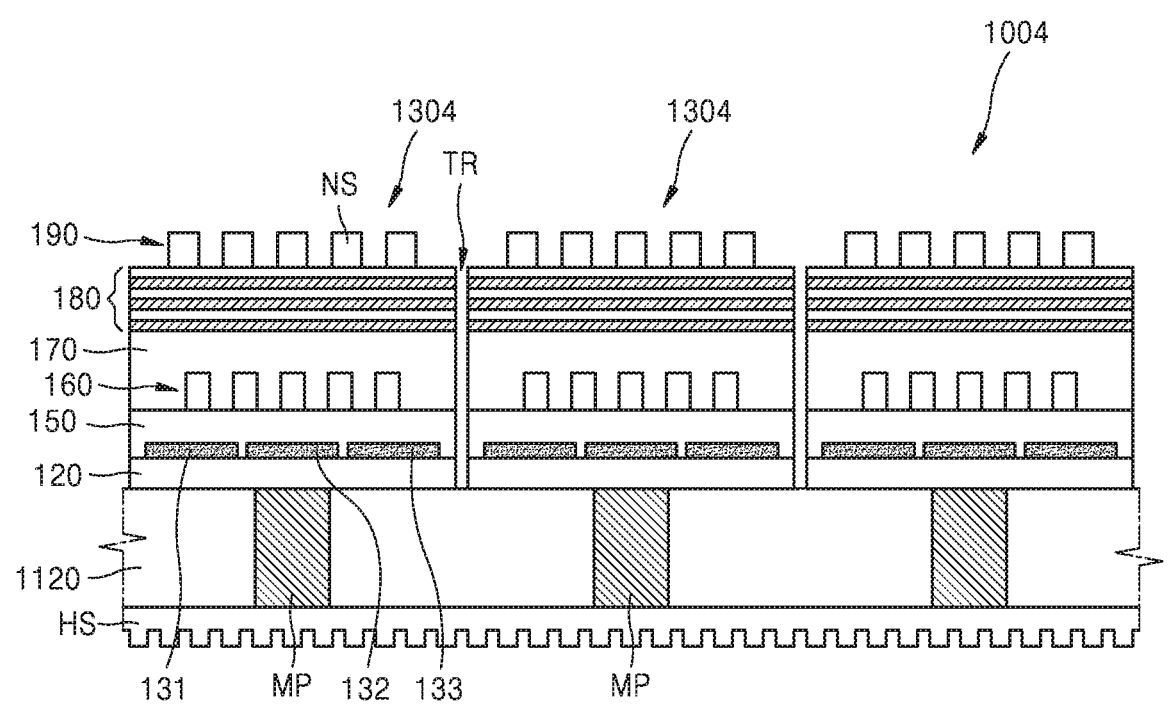
FIG. 15 is a cross-sectional view of a beam steering device according to another example embodiment.

FIG. 15 is a cross-sectional view of a beam steering device 1004 according to another example embodiment.

The beam steering device 1004 of the example embodiment is different from the beam steering device 1003 of FIG. 14 in that each of phase modulation channels 1304 includes a plurality of sub-resistors 131, 132, and 133.

Since the phase modulation channel 1304 includes the plurality of sub-resistors 131, 132, and 133, a refractive index gradient may be formed in the variable mirror 160 included in each of the phase modulation channels 1304. For example, a temperature distribution for implementing a desired refractive index gradient may be generated. However, embodiments are not limited thereto, that is, the plurality of sub-resistors 131, 132, and 133 may be configured to more finely adjust heat generation amounts in order to improve temperature uniformity in the variable mirror 160, as described above with reference to FIG. 5. By including the plurality of sub-resistors 131, 132, and 133, each of the phase modulation channels 1304 may more accurately implement a desired phase modulation. In FIG. 15, all the plurality of phase modulation channels 1304 include the plurality of sub-resistors 131, 132, and 133, but embodiments are not limited thereto. For example, some of the phase modulation channels 1304 may include one electric resistor at a location corresponding to the variable mirror 160.

Figure 16:
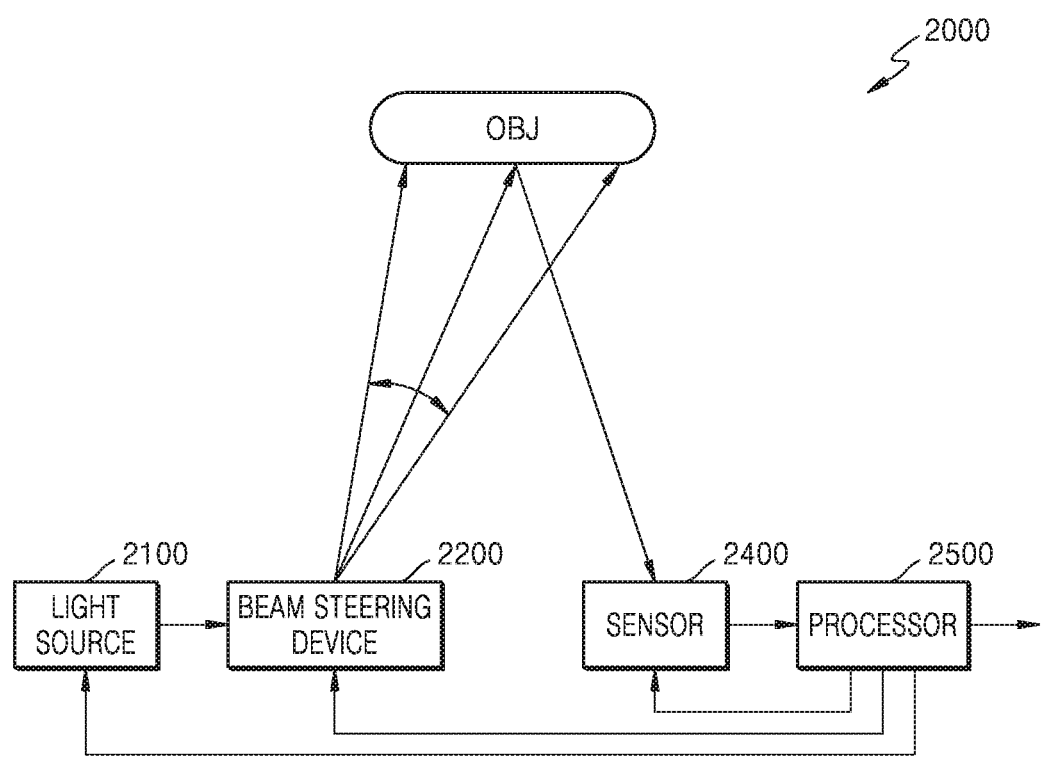
FIG. 16 is a block diagram of an electronic apparatus according to an example embodiment.

FIG. 16 is a block diagram of an electronic apparatus 2000 according to an example embodiment.

The electronic apparatus 2000 may include a light source 2100, a beam steering device 2200, a sensor 2400, and a processor 2500 controlling the light source 2100, the beam steering device 2200, and the sensor 2400. The beam steering device 2200 may aim light emitted from the light source 2100 towards an object OBJ, and the sensor 2400 receives light reflected by the object OBJ.

The light source 2100 radiates light that is to be used to analyze a location and a shape of the object OBJ. The light source 2100 may include a light source that generates and radiates light of a predetermined wavelength. The light source 2100 may include a light source such as a laser diode (LD), a light-emitting diode (LED), a super luminescent diode (SLD), etc. that generates and emits the light of a wavelength band suitable for analyzing the location and the shape of the object OBJ, for example, light of an infrared ray band. The light source 2100 may include an LD having a variable wavelength. The light source 2100 may generate and radiate light of a plurality of different wavelength bands. The light source 2100 may generate and radiate pulse light or continuous light.

The beam steering device 2200 may include a variable mirror that is variable depending on the heat applied, and may implement a desired steering angle by adjusting phase modulation of each of channels. The beam steering device 2200 may include one of the beam steering devices 1000, 1001, 1002, 1003, and 1004 described above, a combination thereof, or a modification thereof. An emitting angle from the beam steering device 220 may be adjusted, as described above, according to a degree of heating the variable mirror included in the beam steering device 2200, and accordingly, a predetermined range including the object OBJ may be scanned.

Other optical members, for example, optical elements for adjustment of a path, beam split, and additional modulation of the light steered by the beam steering device 2200, may be further arranged between the beam steering device 2200 and the object OBJ.

The sensor 2400 may include an array of a plurality of detecting elements configured to detect light reflected by the object OBJ. The sensor 2400 may include arrays of sensors capable of sensing light of a plurality of different wavelengths. The sensor 2400 may include an array of silicon-based photodiodes. While the beam steering device 2200 scans the object OBJ, optical signals received by the sensor 2400 may be used to analyze existence, a location, a shape, etc. of the object OBJ.

The processor 2500 may control overall operations of the electronic apparatus 2000. The processor 2500 may control operations of the light source 2100, the beam steering device 2200, and the sensor 2400. For example, the processor 2500 may perform power supply control, on/off control, pulse wave (PW) or continuous wave (CW) generation control on the light source 2100. Also, the processor 2500 may control signals that are applied to the plurality of phase modulation channels included in the beam steering device 2200, in order to control the emission angle implemented by the beam steering device 2200. For example, a controller for controlling the heating portion may be controlled by the processor 2500 or at least a part of the controller of the beam steering device 2200 may be included in the processor 2500.

The processor 2500 may receive an optical signal from the object OBJ to analyze existence, a location, a shape, a physical property, etc. of the object OBJ. The processor 2500 may perform, for example, a calculation for measuring a time of flight (ToF) and a three-dimensional (3D) shape determination of the object OBJ from the calculation, or analysis of the physical property by using Raman analyzing method.

The processor 2500 may use various operation methods. For example, according to a direct time measuring method, pulse light may be radiated to the object OBJ and a time taken for the light to be reflected by the object OBJ and to return is measured by using a timer and then a distance is calculated. A correlation method measures a distance based on brightness of the returning light reflected from the object OBJ after projecting the pulse light to the object OBJ. According to a phase retardation measuring method, light of a continuous wave such as a sine wave is projected to the object OBJ and a phase difference of returning light reflected by the object OBJ is sensed and converted into a distance.

The processor 2500 may analyze a kind, a component, a concentration, and a physical property of the object OBJ by using a Raman analyzing method, in which a wavelength shift caused by the object OBJ is detected.

The electronic apparatus 2000 may include a memory in which programs required to perform the above operations and other data are stored.

The processor 2500 may transmit a calculation result, that is, information about the shape, the location, and the physical property of the object OBJ, to another unit. For example, the above information may be transferred to an autonomous driving apparatus that requires information about a 3D shape, operations, and location of the object OBJ. The above information may be transferred to medical equipment that uses physical information of the object OBJ, for example, bio-information. The unit to which the calculation result is transferred may include a display apparatus or a printer for outputting the result. In addition, the unit may include, but is not limited to, a smartphone, a mobile phone, a personal digital assistant (PDA), a laptop, a personal computer (PC), and other mobile or non-mobile computing devices.

The electronic apparatus 2000 may include a light detection and ranging (LiDAR) apparatus. The LiDAR apparatus may be used as a sensor that obtains 3D information about a front object, and thus may be applied to an autonomous driving device, for example, a driver-less car, an autonomous car, a robot, a drone, etc.

The light modulating device described above includes the variable mirror including the material having a refractive index varying due to the heat, and thus may variously modulate the phase of incident light.

When a plurality of light modulating devices are arrayed and the phase modulation amount of each light modulating device is adjusted, the light may be modulated into various shapes.

The beam steering device may steer the incident light into a desired direction and may have an improved accuracy by adopting a thermal block structure between adjacent channels.

In the specification, many details are described in detail, but they are not provided to limit the scope of the disclosure, and should be interpreted as illustrating the example embodiment. Thus, the scope of the disclosure should be determined by the technical idea set forth in the claims, not by the example embodiments.

It should be understood that example embodiments described herein should be considered in a descriptive sense only and not for purposes of limitation. Descriptions of features or aspects within each example embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A light modulating device comprising:
    a variable mirror comprising a plurality of lattice structures provided in a horizontal direction, the plurality of lattice structures comprising a material having a refractive index that changes based on a temperature of the material;
    a distributed Bragg mirror spaced apart from the variable mirror and provided above the variable mirror in a vertical direction, the distributed Bragg mirror comprising a first material layer and a second material layer that are alternately stacked, and a refractive index of the first material layer being different from a refractive index of the second material layer;
    a heating portion configured to apply heat the plurality of lattice structures and provided below the variable mirror in the vertical direction opposite to the distributed Bragg mirror; and
    a substrate comprising a through hole and a metal plug provided in the through hole, the substrate being configured to support the heating portion.

2. The light modulating device of claim 1, further comprising a spacer layer provided between the variable mirror and the distributed Bragg mirror, the spacer layer being configured to provide a resonant distance.

3. The light modulating device of claim 2, wherein the spacer layer comprises a material having a refractive index that is less than the refractive index of the plurality of lattice structures.

4. The light modulating device of claim 1, wherein the plurality of lattice structures are provided at a certain period in the horizontal direction perpendicular to the vertical direction in which the first material layer and the second material layer are stacked.

5. The light modulating device of claim 1, wherein the heating portion comprises a heater that is electrically heated and configured to heat the plurality of lattice structures.

6. The light modulating device of claim 5, wherein the heating portion comprises:
    an electric resistor configured to heat the plurality of lattice structures; and
    a circuit element layer configured to supply an electric current to the electric resistor.

7. The light modulating device of claim 6, wherein the electric resistor comprises:
    a plurality of sub-resistors configured to heat a divided region of the variable mirror.

8. The light modulating device of claim 1, further comprising a meta optical device provided above the distributed Bragg mirror opposite to the variable mirror, the meta optical device comprising a plurality of nanostructures.

9. The light modulating device of claim 8, wherein a shape distribution of the plurality of nanostructures is set to increase a phase modulation range between the variable mirror and the distributed Bragg mirror based on a change in the refractive index of the plurality of lattice structures.

10. The light modulating device of claim 1, further comprising a heat sink provided on a surface of the substrate opposite to the heating portion.

11. A beam steering device comprising:
    a substrate;
    a phase modulating device comprising a plurality of phase modulation channels that are repeatedly provided on the substrate,
    wherein each of the plurality of phase modulation channels comprises:
        a variable mirror comprising a plurality of lattice structures provided in a horizontal direction, each of the plurality of lattice structures comprising a material having a refractive index that changes based on a temperature of the material, and
        a distributed Bragg mirror spaced apart from the variable mirror and provided above the variable mirror in a vertical direction, the distributed Bragg mirror comprising a first material layer and a second material layer that are alternately stacked, a refractive index of the first material layer being different from a refractive index of the second material layer;
    a heating portion provided between the substrate and the phase modulating device and below the variable mirror in the vertical direction opposite to the distributed Bragg mirror, the heating portion being supported by the heating portion and configured to apply heat to each of the plurality of lattice structures; and
    a controller configured to apply a control signal to the heating portion,
    wherein the substrate comprises a through hole and a metal plug provided in the through hole.

12. The beam steering device of claim 11, further comprises trenches that are provided between adjacent phase modulation channels among the plurality of phase modulation channels.

13. The beam steering device of claim 12, wherein the trenches comprise air trenches, vacuum trenches, or heat insulation trenches configured to prevent a thermal transfer between adjacent phase modulation channels.

14. The beam steering device of claim 12, wherein the trenches partly extend in the heating portion.

15. The beam steering device of claim 14, wherein the trenches extend to a certain depth of the substrate.

16. The beam steering device of claim 12, wherein the heating portion comprises:
    a plurality of electric resistors respectively facing the plurality of phase modulation channels in a one-to-one correspondence; and
    a circuit element layer configured to supply an electric current to the plurality of electric resistors.

17. The beam steering device of claim 16, wherein each of the plurality of electric resistors comprises a plurality of sub-resistors that are configured to heat a divided region of a phase modulation channel facing each electric resistor among the plurality of phase modulation channels.

18. The beam steering device of claim 16, wherein the trenches extend to a region between adjacent electric resistors among the plurality of electric resistors.

19. The beam steering device of claim 11, further comprising a heat sink provided on a surface of the substrate opposite to the heating portion.

20. The beam steering device of claim 11, wherein each of the plurality of phase modulation channels further comprises:
a spacer layer provided between the variable mirror and the distributed Bragg mirror, and configured to provide a resonant distance, the spacer layer comprising a material having a refractive index less than the refractive index of the plurality of lattice structures.

21. The beam steering device of claim 11, wherein the plurality of lattice structures are provided at a certain period in the horizontal direction perpendicular to the vertical direction in which the first material layer and the second material layer are stacked.

22. The beam steering device of claim 11, wherein each of the plurality of phase modulation channels further comprises a meta optical device provided above the distributed Bragg mirror, the meta optical device comprising a plurality of nanostructures.

23. The beam steering device of claim 22, wherein a shape distribution of the plurality of nanostructures is set to increase a phase modulation range between the variable mirror and the distributed Bragg mirror based on a change in the refractive index of each of the plurality of lattice structures.

24. An electronic apparatus comprising:
a light source configured to emit light;
a beam steering device configured to steer the light emitted from the light source towards an object, the beam steering device comprising:
a substrate;
a phase modulating device comprising a plurality of phase modulation channels that are repeatedly provided on the substrate,
wherein each of the plurality of phase modulation channels comprises:
a variable mirror comprising a plurality of lattice structures provided in a horizontal direction, each of the plurality of lattice structures comprising a material having a refractive index that changes based on a temperature of the material, and
a distributed Bragg mirror spaced apart from the variable mirror and provided above the variable mirror in a vertical direction, the distributed Bragg mirror comprising a first material layer and a second material layer that are alternately stacked, and a refractive index of the first material layer being different from a refractive index of the second material layer;
a heating portion provided between the substrate and the phase modulating device and below the variable mirror in the vertical direction opposite to the distributed Bragg mirror, the heating portion being supported by the substrate and configured to apply heat to each of the plurality of lattice structures; and
a controller configured to apply a control signal to the heating portion;
a sensor configured to receive light from the object; and
a processor configured to analyze a location or a shape of the object based on a signal transmitted from the sensor,
wherein the substrate comprises a through hole and a metal plug provided in the through hole.

* * * * *